United States Patent
Vicente et al.

(10) Patent No.: US 8,631,982 B2
(45) Date of Patent: Jan. 21, 2014

(54) SAFE ATTACHED TO THE HITCH OF A VEHICLE

(75) Inventors: Robert Anthony Vicente, Huntington Beach, CA (US); Philip Andrew Litwa, Newport Beach, CA (US)

(73) Assignee: Robert Anthony Vicente, Huntington Beach, CA (US)

( * ) Notice: Subject to any disclaimer, the term of this patent is extended or adjusted under 35 U.S.C. 154(b) by 164 days.

(21) Appl. No.: 13/035,944

(22) Filed: Feb. 26, 2011

(65) Prior Publication Data
US 2011/0210153 A1    Sep. 1, 2011

Related U.S. Application Data

(60) Provisional application No. 61/308,893, filed on Feb. 26, 2010.

(51) Int. Cl.
*B60R 9/00*    (2006.01)

(52) U.S. Cl.
USPC ............. 224/519; 224/569; 224/535; 109/51; 70/63

(58) Field of Classification Search
USPC .................. 403/361; 224/519, 527, 535, 569; 109/45, 50–52, 58, 58.5, 59 R; 70/14, 70/57, 58, 32–34, 63
See application file for complete search history.

(56) References Cited

U.S. PATENT DOCUMENTS

| | | | | |
|---|---|---|---|---|
| 508,895 | A | * 11/1893 | Meyers | ........................... 109/54 |
| 4,926,762 | A | 5/1990 | Paul | |
| 4,938,399 | A | * 7/1990 | Hull et al. | ..................... 224/521 |
| 5,947,038 | A | 9/1999 | Smith | |
| 6,598,897 | B1 | * 7/2003 | Patti | .............................. 280/507 |
| 7,066,483 | B2 | 6/2006 | Makos | |
| 2003/0094472 | A1 | * 5/2003 | Knodle et al. | ................ 224/509 |
| 2005/0199021 | A1 | * 9/2005 | Freeman | ........................... 70/63 |
| 2006/0091172 | A1 | * 5/2006 | Gray et al. | ..................... 224/519 |
| 2008/0087699 | A1 | * 4/2008 | Zhang | ............................ 224/519 |
| 2008/0098939 | A1 | 5/2008 | Kalous | |

FOREIGN PATENT DOCUMENTS

GB    2311050 A  *  9/1997

OTHER PUBLICATIONS

HitchSafeWebsite.pdf (Screen Shot of http://www.hitchsafe.com/), Attached.

* cited by examiner

*Primary Examiner* — Nathan J Newhouse
*Assistant Examiner* — Phillip Schmidt
(74) *Attorney, Agent, or Firm* — Cionca Law Group P.C.; Marin Cionca

(57) ABSTRACT

A safe is provided comprising a main box having a predetermined size, such that the safe may also be used as a step; a lockable flip lid pivotally connected to the inside of said main box; a top lid, pivotally connected to the upper edge of said main box such that it disguises the said flip lid, and configured such that it is capable of being used as a step; and means for locking the safe to the hitch of a vehicle.

12 Claims, 7 Drawing Sheets

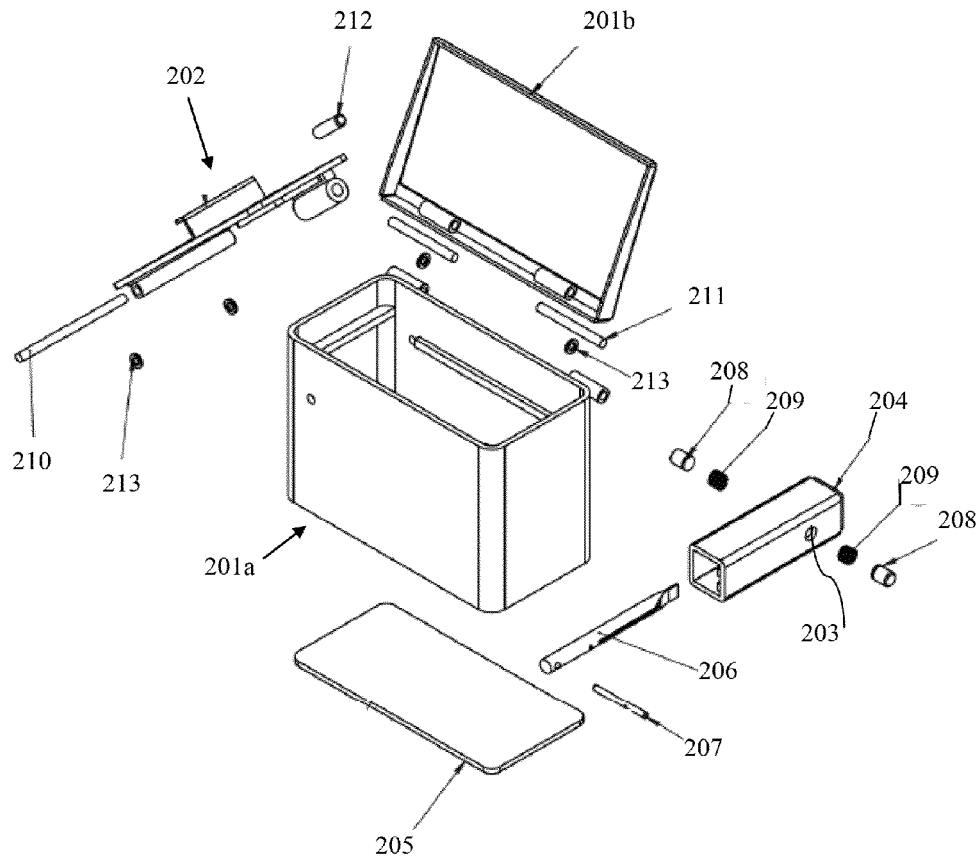
FIG. 2a
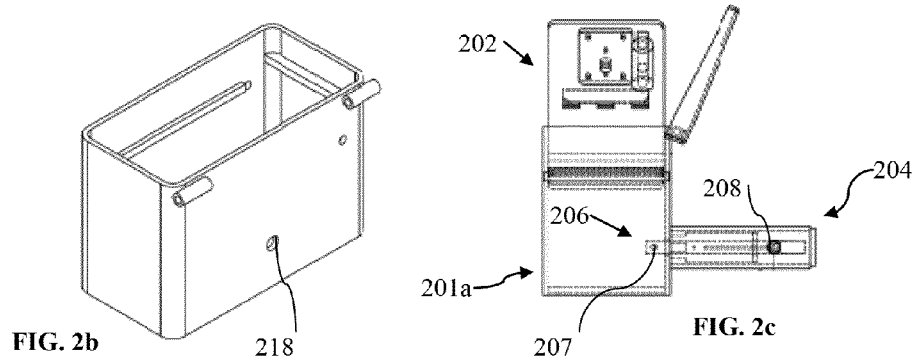
FIG. 2b
FIG. 2c

FIG. 4a                   FIG. 4b

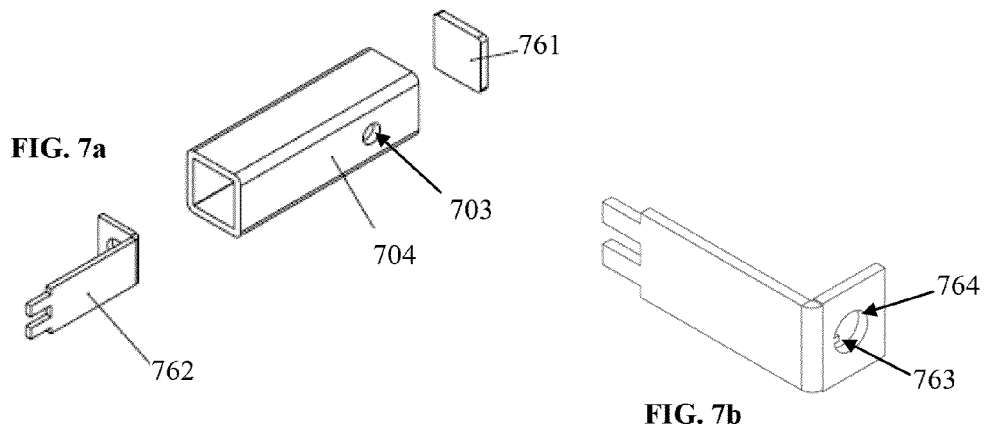
FIG. 7a
FIG. 7b
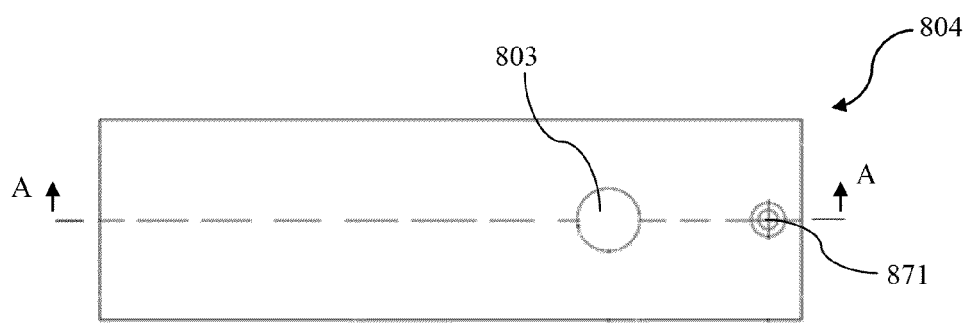
FIG. 8a
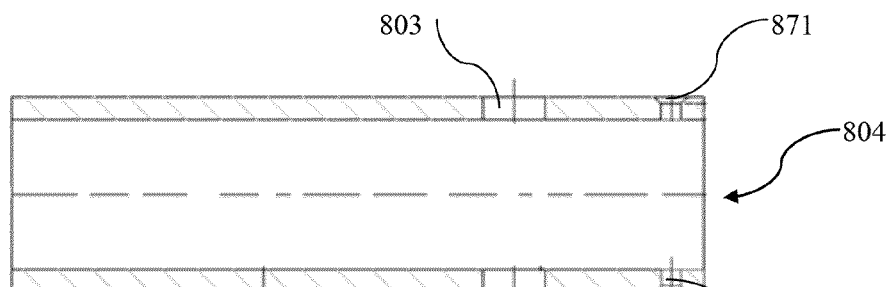
FIG. 8b
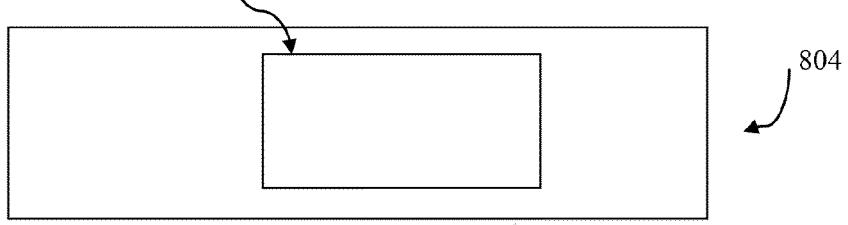
FIG. 8c

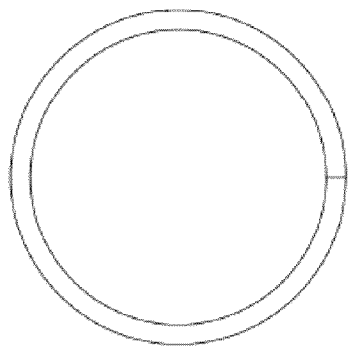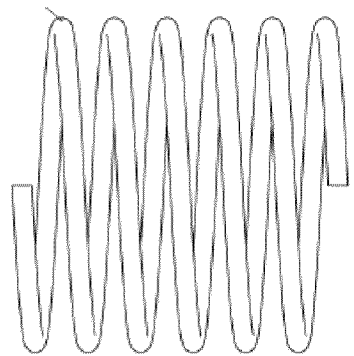
FIG. 9a                    FIG. 9b

US 8,631,982 B2

SAFE ATTACHED TO THE HITCH OF A VEHICLE

CROSS-REFERENCE TO RELATED APPLICATIONS

This application claims the benefit of U.S. Provisional Application No. 61/308,893, filed Feb. 26, 2010, which is hereby incorporated by reference, to the extent that it is not conflicting with the present application.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The present invention relates generally to safe technology and particularly to safes which can be installed outside of a vehicle, namely into the hitch of a vehicle.

2. Description of the Related Art

When people travel by car for recreational purposes, such as camping, fishing or hiking, they often have the need to leave and lock their valuable items in a safe place. They don't want to worry about their keys, wallets, hand guns, or other valuable items. Locking these valuable items inside the vehicle it is not a good solution because a thief could easily break a window of the vehicle and steal these valuable possessions from the owner.

While there are currently on the market safes which may be installed into a vehicle's hitch, those safes are difficult to install and uninstall and/or are too small to store anything larger than a small wallet, the size of credit card, and maybe some keys. Those safes do not allow the owner to safely store larger, but valuable items, such as a hand gun. Furthermore, often people need to step on something to access the back of their vehicles. The existing hitch safes are inapt to fulfill such a purpose.

Therefore, a need exists for a better hitch-connected safe that addresses the problems presented above.

The problems and the associated solutions presented in this section could be or could have been pursued, but they are not necessarily approaches that have been previously conceived or pursued. Therefore, unless otherwise indicated, it should not be assumed that any of the approaches presented in this section qualify as prior art merely by virtue of their presence in this section of the application.

BRIEF SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In one exemplary embodiment, an easy to use and quick engage-disengage mechanism is used for connecting the safe to the vehicle's hitch. Thus, an advantage is that the user can easily and rapidly install and uninstall the safe to the vehicle's hitch.

In another exemplary embodiment, the safe is configured to incorporate a properly sized main box, such that it makes it suitable for safely storing larger items such as a hand gun. Thus, another advantage is the safe's aptness of offering to the user the option to safely store larger items.

In another exemplary embodiment, the safe has a robust structural configuration, and it is equipped with a strong, flat and properly sized top lid, such that it makes the safe suitable for use as a step. Thus, another advantage is the availability of a step in the back of the vehicle when the safe is connected to the vehicle's hitch.

The above embodiments and advantages, as well as other embodiments and advantages, will become apparent from the ensuing description and accompanying drawings.

BRIEF DESCRIPTION OF THE DRAWINGS

For exemplification purposes, and not for limitation purposes, embodiments of the invention are illustrated in the figures of the accompanying drawings, in which:

FIG. 2a illustrates an exploded view of the hitch-mountable safe from FIG. 1.

FIG. 2b illustrates a "back" perspective view of the main box 201a depicted in FIG. 2a.

FIG. 2c illustrates a side view of the hitch-mountable safe from FIG. 1.

FIGS. 3a and 3b illustrate a top-perspective and a side view, respectively, of the top lid 201b depicted in FIG. 2a.

FIG. 3c illustrate a bottom-perspective view of the top lid 201b depicted in FIG. 2a.

FIG. 4a illustrates a bottom-perspective view of the flip lid 202 depicted in FIG. 2a.

FIG. 4b illustrates an exploded view of the flip lid 202 depicted in FIG. 2a.

FIGS. 5a-c illustrate a front, perspective and top view, respectively, of the side pin 208 depicted in FIG. 2a.

FIGS. 6a-b illustrate a top and perspective view, respectively, of the handle shaft 206 depicted in FIG. 2a.

FIG. 6c illustrates a perspective view of the handle pin 207 depicted in FIG. 2a.

FIG. 7a illustrates an exploded view of the hitch tube 204 depicted in FIG. 2a.

FIG. 7b illustrates a perspective view of the hitch tube sleeve 762 depicted in FIG. 7a.

FIG. 8a illustrates a side view of a variation of the hitch tube 204 depicted in FIG. 2a.

FIG. 8b illustrates a sectional view, taken along line A-A, of the hitch tube from FIG. 8a.

FIG. 8c illustrates a bottom view of the hitch tube from FIG. 8a.

FIGS. 9a and 9b illustrate a front and a side view, respectively, of the spring 209 depicted in FIG. 2a.

DETAILED DESCRIPTION OF THE PREFERRED EMBODIMENTS

Figure 1:
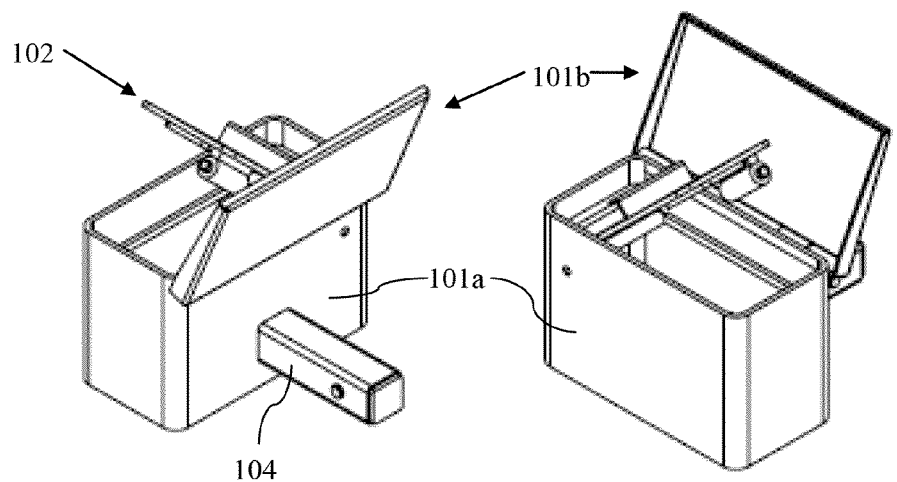
FIG. 1 illustrates "back" and "front" perspective views of a hitch-mountable safe, in accordance with several embodiments.

What follows is a detailed description of the preferred embodiments of the invention in which the invention may be practiced. Reference will be made to the attached drawings, and the information included in the drawings is part of this detailed description. The specific preferred embodiments of the invention, which will be described herein, are presented for exemplification purposes, and not for limitation purposes. It should be understood that structural and/or logical modifications could be made by someone of ordinary skills in the art without departing from the scope of the present invention. Therefore, the scope of the present invention is defined by the accompanying claims and their equivalents.

FIG. 1 illustrates "back" and "front" perspective views of a hitch-mountable safe ("safe"), in accordance with several embodiments. As shown, safe comprises a main box 101a, a top lid 101b, a flip lid 102 and a hitch tube 104. The hitch tube 104 may be associated with the main box 101a using, preferably, means for permanent securement, such as welding. The hitch tube 104 may be secured to the main box 101a at a lower level than suggested in FIG. 1 so that a weep hole from main box 101a to hitch tube 104 and out to the end cap (761 in FIG. 7a) or to the bottom (i.e., facing the ground) face of hitch tube 104. The main box 101a has a shape which is similar to that of a rectangular parallelepiped, which has the four vertical edges rounded. One advantage of the rounded edges is that of preventing cut injuries to the user. The main box 101a is configured to accommodate larger personal items, such as a hand gun, and, together with the other elements of the safe, to be strong and large enough, so that the safe may be used as a step in the back of a vehicle. For example, the main box 101a may have the following outside dimensions, in millimeters ("mm"): length 304.8 mm (i.e., 12 inches), width 152.4 mm (i.e., 6 inches) and height 203.2 mm (i.e., 8 inches). One of ordinary skills in the art would recognize that the shape and the dimensions of the main box 101a, and thus, of the safe itself, may be modified and still keep its capability of fulfilling its major functions as described herein (i.e., safe for larger items, and step). Thus, such modifications would be within the scope of the invention. For example, the shape of the main box 101a or of the safe itself may be hexagonal, oval, spherical, cylindrical, and so on. Furthermore, the above dimensions may, for example, be increased such that the safe may securely store larger-in-size valuable personal items such as a laptop computer or a rifle.

The main box 101a may be manufactured from a 304.8× 152.4 mm (6×12 inch) steel tube having a wall thickness of, for example, 6.4 mm (0.25 inches), and a length of 203.2 mm (8 inches). To permanently enclose one end of the steel tube (i.e., the bottom side of the main box 101a), a steel plate (205 in FIG. 2a), having the same thickness (6.4 mm), may be welded at that end of the steel tube. At the other end (i.e., the upper side of the main box 101a), two lids are connected to the main box 101a, as shown. First, a flip lid 102 may be hinged to the inside of the main box 101a, below (e.g., 52.4 mm below) the upper edge of the main box 101a. A standard safe lock (not shown) may be mounted to the flip lid 102, thus making it possible to lock personal items (keys, wallet, hand gun, etc) inside the safe.

Second, a top lid 101b may be hinged to the outside of the main box 101a and close to its upper edge. Preferably, the top lid 101b does not have a locking mechanism. One of its purposes is to disguise the flip lid 102 and the safe lock (not shown), and thus, the fact that this "box" is actually a safe. This may prevent attacks by would be thieves. Another purpose of the top lid 101b is to function as a proper platform, by providing a strong, flat surface, for the foot/feet of a user. Hence, the safe may be used as a step to access the back of a vehicle, especially when the safe is attached to that vehicle's hitch. Yet another purpose of the top lid 101b is to protect the inside of the safe, including the flip lid 102, the safe lock (not shown) and the items stored in the safe, from environmental agents such as rain.

It should be understood that the entire safe may be manufactured from aluminum, or other light-weight materials, as long as the security/safe and step functions of the safe are not impaired. Using a lighter material may be desirable for larger size safes for purposes such as decreasing the gas consumption of the vehicle if the vehicle is on the road with the safe attached to its hitch.

Figure 4C:
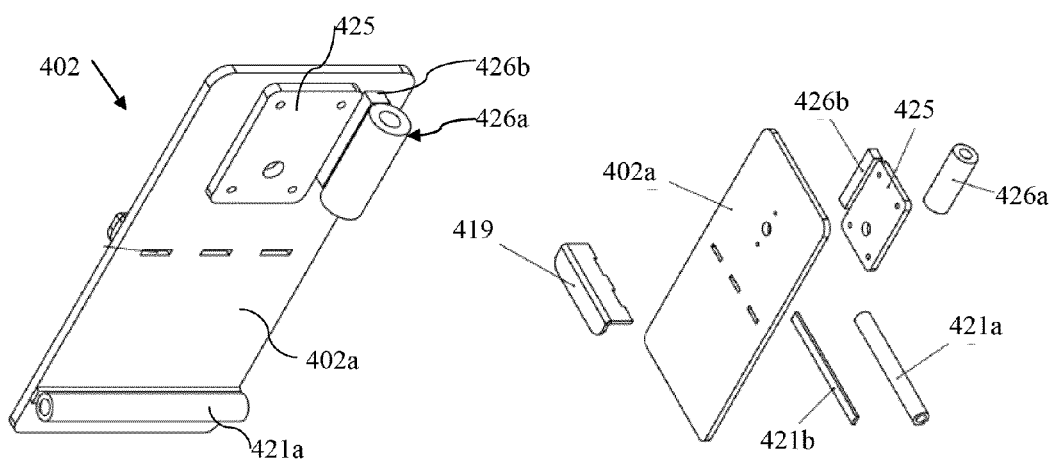
FIG. 4c illustrates a perspective view of a lock stop plate.
Figure 4C:
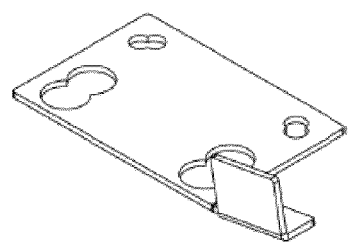

FIG. 2a illustrates an exploded view of the hitch-mountable safe from FIG. 1. As earlier explained, the main box 201a may be manufactured from a steel tube to which a steel plate 205 may be welded to create the bottom of the main box. Also, as described above, the flip lid 202 and the top lid 201b may be hinged to the inside and the outside, respectively, of the main box 201a of the safe. The shown flip lid rod 210, the top lid pin 211, as well as the washers 213, may be used for that purpose (i.e., hinging the two lids). Furthermore, as explained below, when discussing FIG. 4a, the lock pin 212 may be configured to lock the flip lid 202 when a would-be thief tampers with the safe's lock mechanism (not shown).

A perspective view of the hitch tube 204 is also depicted in FIG. 2a, with the two holes 203 (one on the opposite side not shown) for the spring 209 loaded side pins 208, which may be engaged by the handle shaft 206 as explained later herein. When mounted, the handle shaft 206, passes through the hole 218 (FIG. 2b) made in the back of the safe's main box and continues inside the hitch tube 204, as depicted in FIG. 2c. A portion of the handle shaft 206 remains inside the main box 201a (see FIG. 2c), wherein, with the aid of the handle pin 207, which is firmly attached, such as by welding, to that portion of the handle shaft 206, a user may access and actuate the hand shaft 206. The handle pin 207 may be completely eliminated if, for example, that portion of the handle shaft 206 that remains inside main box 201a is knurled, so that the user has a good grip on it. Thus, from the inside of the main box 201a, when the flip lid 202 is open, the user of the safe can engage/disengage the spring loaded side pins 208 in order to lock/unlock the safe into/from the hitch of a vehicle.

The side pins 208 may be made of materials such as steel, hardened steel, stainless steel, or other alloys, and may be chrome plated. The hole 203 may be oversized and lined with a bronze sleeve bearing.

Figure 3A:
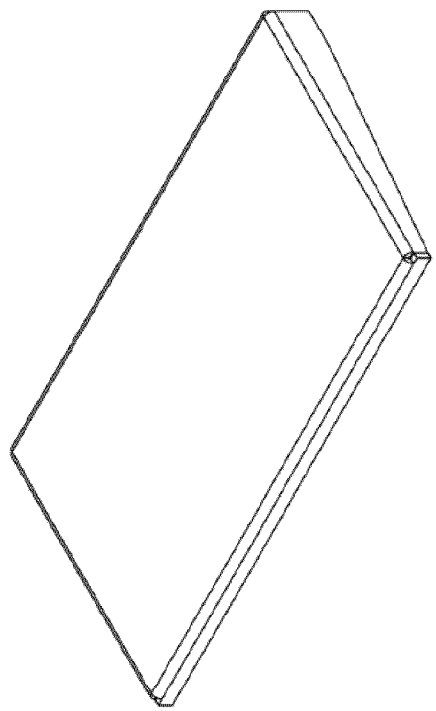
Figure 3B:
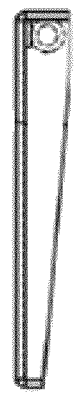

FIGS. 3a and 3b illustrate a perspective and a side view, respectively, of the top lid 201b depicted in FIG. 2a. In order to fulfill the purposes described earlier (disguise, step, protect), without unnecessarily increase the weight of the safe, the top lid may be manufactured from sheet metal which may have, for example, a thickness of 3.4 mm (0.135 inch). Other materials may be used, such as aluminum. Furthermore, the top lid could have slip resistant coating on its top surface. Moreover, a sheet of slip resistant materials, such as rubber, may be attached to the flip lid's top surface. Besides the obvious benefit (i.e., to prevent slip accidents when a person steps on it), such a configuration may enhance the top lid's role to disguise the safe.

Figure 3C:
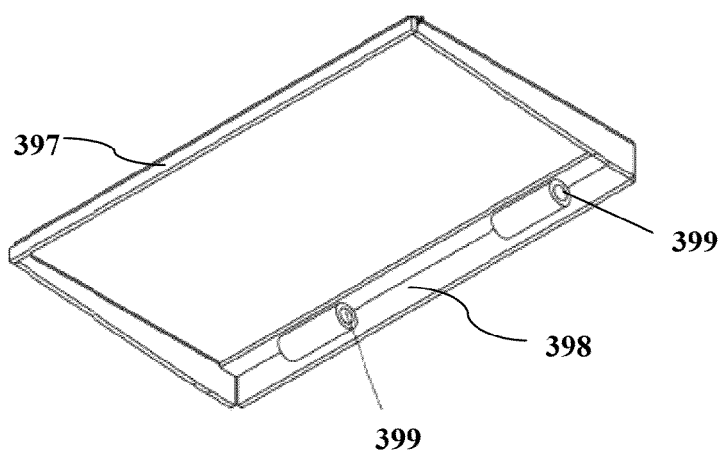

FIG. 3c illustrate a bottom-perspective view of the top lid 201b depicted in FIG. 2a. As shown, the back vertical face 398 of the top lid has a greater height than its front vertical face 397. This configuration permits the protection of the two hinges 399 from environmental agents such as rain. Furthermore, all of the four vertical faces of the top lid, in conjunction with its top/horizontal face, permit the protection of the inside of the safe from environmental agents. In addition, as explained earlier, the top lid disguises the safe by "hiding" the flip lid 102 (FIG. 1) and the safe lock, and makes possible the use of the safe as a step for easier access of the back of a vehicle.

FIG. 4a illustrates a bottom-perspective view, while FIG. 4b illustrates an exploded view, of the flip lid 202 depicted in FIG. 2a. In order to fulfill the desired security purposes, the flip lid plate 402a may be manufactured from sheet metal that is at least as thick as the walls of the safe's main box (i.e., 6.4 mm or 0.25 inches). As shown, for reinforcement purposes, but also to facilitate the installation of a lock mechanism (not shown), a lock plate 425 may be attached, such as by welding, to the flip lid plate 402a. The lock plate 425 may be made of steel, hardened steel or other similar materials. A standard lock mechanism, such as a keypad or combination lock, may be then secured to the lock plate 425, preferably by bolting. That lock mechanism is what the user of the safe will use to lock the flip lid 402, and thus, to secure his/her personal items (keys, wallet, hand gun, etc) inside the safe.

A lock pin sleeve 426a, or other guiding means, may also be fasten, such as by welding, to the flip lid plate 402a. A lock pin spacer 426b may be used between the lock pin sleeve 426a and flip lid plate 402a. The lock pin sleeve 426a guides a spring loaded lock pin (212 in FIG. 2a), which, in combination with the lock stop plate depicted in FIG. 4c, as it is well known in the art, works to lock the flip lid when a would-be thief tampers with the lock mechanism of the safe. Thus, the items stored in the safe by the user would remain secured inside the safe, even when a would-be thief breaks the lock mechanism, such as by applying a hammer blow to the lock's keypad.

As earlier described, the flip lid 402 may be hinged to the main box (201a in FIG. 2a) of the safe. For this purpose, a flip lid hinge 421a may be fasten, such as by welding, to the flip lid plate 402a. A flip lid hinge spacer 421b may be used between the flip lid hinge 421a and flip lid plate 402a. Furthermore, for easy opening and closing of the flip lid 402, a flip lid handle 419 may also be attached, such as by welding, to the top face of the flip lid plate 402a.

Figure 5A:
Figure 5B:
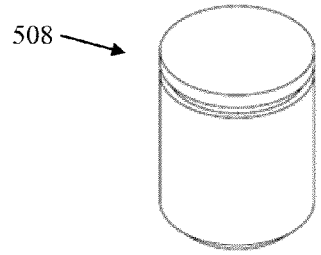
Figure 5C:
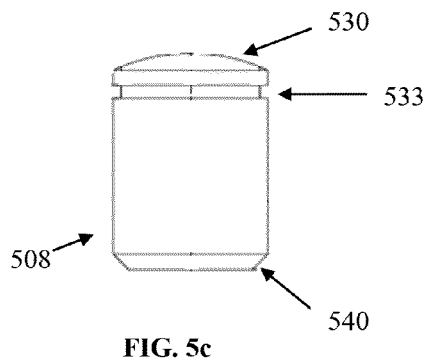

FIGS. 5a-c illustrate a front, perspective and top view, respectively, of a side pin 208 depicted in FIG. 2a. The convex end 530 has preferably a circular surface, and is the internal end of the side pin 508. The convex ends 530 of the two side pins 508 (208 in FIG. 2a) are facing each other inside the hitch tube 204 (FIG. 2a). The convex ends 530 facilitate the action of the handle shaft 206 (FIG. 2a), as it will be explained below.

Some portion of the side pin 508, starting with the conical end 540, is configured for fitting and entering through the preexisting holes of a standard vehicle hitch in order to lock the safe into that hitch. The conical shape, or another similar shape, may help facilitate that entering. The groove 533 may be used to retain at that location, by using a snapping C-washer for example, one end of a coaxially installed spring (209 in FIG. 2a) onto the side pin 508. A sample of such spring is depicted in FIGS. 9a and 9b. The other end of the respective spring will be constrained by the inside wall of the hitch tube 204 (FIG. 2a). The springs for each of the two side pins 508 (208 in FIG. 2a) are in a compressed state when the side pins 508 are in a lock position, and thus, the safe is locked into the hitch. The compression is caused by the handle shaft 206 (FIG. 2a), as explained below.

Figure 6A:
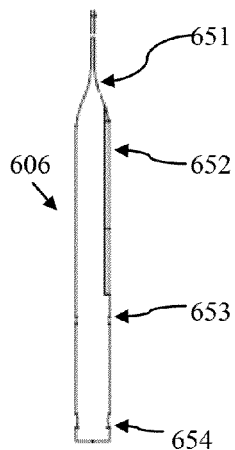
Figure 6B:
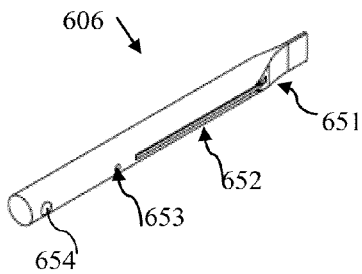

FIGS. 6a-b illustrate a top and perspective view, respectively, of the handle shaft 206 depicted in FIG. 2a. The transitional end 651 starts with a circular cross section and ends with a thin, rectangular-like cross-section. This shape of the transitional end 651 helps transition smoothly from the lock to the unlock position, and vice versa, of the two side pins (208 in FIG. 2a).

By default, a thicker portion of the transitional end 651, and/or a portion of the handle shaft 606 which is immediately next to the transitional end 651 (i.e., a portion which has approximately a circular cross-section), sits in between the two convex ends (530 in FIG. 5c) of the two side pins, forcing the two side pins outwardly, through the preexisting holes of a standard hitch, hence, causing in effect the lock position of the side pins. When the handle shaft 606 (206 in FIG. 2c) is pulled backward by a user (i.e., away from the side pins 208), consequently, the thin portion of the transitional end 651 sits between the two convex ends (530 in FIG. 5c) of the two side pins (208 in FIG. 2c). Thus, the two springs 209 (FIG. 2a) are allowed to decompress, causing the two sides pins 208 to withdraw from the hitch's holes (i.e., the unlock position).

The key slot 652 helps guide the handle shaft 606 and, more importantly, it prevents the handle shaft 606 from engaging in rotational motion as explained below. The hole for cotter pin 653 helps constrain at that location, by using a cotter pin, one end of a coaxially installed spring (not shown) onto the handle shaft 606. A sample of such spring is depicted in FIGS. 9a and 9b. The other end of the respective spring is constrained by the outside wall of the main box 201a (FIG. 2c) facing the hitch tube 204.

When the handle shaft 606 (206 in FIG. 2c) is pulled backward, in order to unlock the side pins 208 as explained above, the respective spring (not shown) of the handle shaft 606 is compressed. When the handle shaft 606 is released, the respective spring decompresses and in the process it pushes and keeps the handle shaft 606 in a forward position which translates in a lock position of the side pins, as explained above.

Figure 6C:
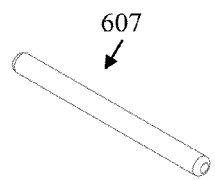

The handle pin 607 depicted in FIG. 6c may be inserted, centered, and firmly secured, such as by welding, in the hole 654 of the handle shaft 606. The purpose of the handle pin 607 is to help the user pull the handle shaft 606 backward, and thus unlock the two side pins (208 in FIG. 2c) from the hitch of a vehicle. The handle shaft 606 may be, preferably, 4 to 24 inches in length.

It should be noted that, because of this easy-to-use hitch locking configuration, the user can quickly and effortlessly lock and unlock the safe onto the hitch of a vehicle. Just a simple, short and easy pull-back action unlocks the safe. A release of the handle shaft is all it takes to lock the safe onto the hitch. It should also be noted that a user may have access to the handle shaft only when the flip lid of the safe is unlocked. This means that only a user who knows how to unlock the locking mechanism of the safe may disconnect the safe from the hitch.

FIG. 7a illustrates an exploded view of the hitch tube 204 depicted in FIG. 2a. FIG. 7b illustrates a perspective view of the hitch tube sleeve 762 depicted in FIG. 7a. The hitch tube sleeve 762 may be secured, such as by welding, inside the hitch tube 704. The handle shaft hole 764, and the hole (218 in FIG. 2b) in the main box's back wall, guide the handle shaft in its pull-back, release-forward movements necessary to unlock and lock, respectively, the side pins, as explained above. The key slot protrusion 763 fits into and works with the key slot 652 (FIG. 6a) to prevent rotational movements of the handle shaft 606 and provide additional guiding means. The hitch tube hole 703 (803 in FIG. 8a), and a corresponding hole on the opposite side, as shown in FIG. 8b, is provided, as explained earlier, to accommodate portions of the two side pins (208 in FIG. 2a). The hitch tube 704 may be built to fit and lock into a standard 1, 1.5, or 2 inches vehicle hitch, or other standard hitches, available on the market. The hitch tube 704 may be, preferably, 4 to 15 inches long.

The end cap 761 of the hitch tube 704 (804 in FIGS. 8a and 8b) may be fasten irremovably, such as by welding, or removably, such as by bolting, in which case end cap holes 871 may be provided into the hitch tube 804. A removable cap permits access to the inside of the hitch tube 704, for maintenance purposes for example, should the need arise. This is important because, as explained earlier, several components are housed inside the hitch tube 704 (the two side pins, their springs, the handle shaft and its spring, etc). As additional or stand-alone access point(s), a side door 880 may also be provided in one or more sides of the hitch tube 804. One preferred side may be the bottom (i.e., facing the ground) of the hitch tube 804 in order to prevent agents, such as water, from entering the inside of the hitch tube.

The spring depicted in FIGS. 9a-b may have closed and ground ends, left or right-hand wound and may be plated or stainless for weather resistance. Furthermore, the spring may be substituted with other types of springs such as a Bellville spring or a disc spring.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions.

Furthermore, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein.

Additionally, even though some features, concepts or aspects of the inventions may be described herein as being a preferred arrangement or method, such description is not intended to suggest that such feature is required or necessary unless expressly so stated.

Furthermore, exemplary or representative values and ranges may be included to assist in understanding the present disclosure; however, such values and ranges are not to be construed in a limiting sense and are intended to be critical values or ranges only if so expressly stated.

Moreover, while various aspects, features and concepts may be expressly identified herein as being inventive or forming part of an invention, such identification is not intended to be exclusive, but rather, there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

Although specific embodiments have been illustrated and described herein for the purpose of disclosing the preferred embodiments, someone of ordinary skills in the art will easily detect alternate embodiments and/or equivalent variations, which may be capable of achieving the same results, and which may be substituted for the specific embodiments illustrated and described herein without departing from the scope of the present invention. Therefore, the scope of this application is intended to cover alternate embodiments and/or equivalent variations of the specific embodiments illustrated and/or described herein. Hence, the scope of the present invention is defined by the accompanying claims and their equivalents. Furthermore, each and every claim is incorporated as further disclosure into the specification and the claims are embodiment(s) of the present invention.

What is claimed is:

1. A safe comprising:
    a main box having a predetermined size, such that the safe may also be used as a step, the main box having a bottom and left, right, front and back side walls;
    a lockable flip lid pivotally connected to the inside of said main box;
    an unlockable top lid, pivotally connected to the upper edge of said main box such that it disguises the lockable flip lid, and thus the safe, and configured such that it is capable of being used as a step; and
    means for locking and unlocking the safe to and from the hitch of a vehicle, wherein the unlocking is performed by actuating a first portion of a spring biased shaft, said first portion residing inside said main box while the remaining portion of the spring biased shaft extends out from said main box through a hole in the back side wall.

2. The safe of claim 1, wherein said size permits the storing of a hand gun inside said safe.

3. The safe of claim 1, wherein said size is: length 304.8 mm, width 152.4 mm and height 203.2 mm.

4. The safe of claim 1, wherein said main box, said flip lid and said top lid are manufactured from sheet steel having a thickness of 6.4 mm.

5. The safe of claim 1, wherein said means for locking the safe to the hitch of a vehicle are partially or completely housed by a hitch tube which is connected to and extends outwardly from said main box's back side wall outer surface.

6. The safe of claim 5, wherein said hitch tube has a wall thickness of 6.4 mm.

7. A safe comprising:
    a main box having a predetermined size, and a plurality of side walls, such that the main box does not fit into the hitch of a vehicle, and thus, the main box must be installed outside the hitch of a vehicle, and such that the safe may also be used as a step;
    at least one lid, one of which being lockable, pivotally connected to said main box; and
    means for locking and unlocking the safe to and from the hitch of a vehicle, said means being connected to said main box, and wherein the unlocking is performed by retracting a spring biased shaft, by actuating a portion of the spring biased shaft residing inside the main box, wherein said portion cannot be accessed without first unlocking the lockable lid, wherein the spring biased shaft extends out from said main box through a hole in one of the main box' side walls, wherein, the spring biased shaft has a tapered distal end in direct contact with two spring loaded side pins' convex internal ends, such that the retracting of the spring biased shaft causes the two spring loaded side pins to retract from the holes of the hitch of the vehicle.

8. The safe of claim 7, wherein said size permits the storing of a hand gun inside said safe.

9. The safe of claim 7, wherein said size is: length 304.8 mm, width 152.4 mm and height 203.2 mm.

10. The safe of claim 7, wherein said main box, is manufactured from sheet steel having a thickness of 6.4 mm.

11. The safe of claim 7, wherein said means for locking the safe to the hitch of a vehicle are partially or completely housed by a hitch tube which is connected to and extends outwardly from the outer surface of one of said main box's side walls.

12. The safe of claim 11, wherein said hitch tube has a wall thickness of 6.4 mm.

\* \* \* \* \*